United States Patent [19]
Weiss

[11] Patent Number: 5,485,519
[45] Date of Patent: Jan. 16, 1996

[54] ENHANCED SECURITY FOR A SECURE TOKEN CODE

[75] Inventor: Kenneth P. Weiss, Newton, Mass.

[73] Assignee: Security Dynamics Technologies, Inc., Cambridge, Mass.

[21] Appl. No.: 67,517

[22] Filed: May 25, 1993

Related U.S. Application Data

[63] Continuation-in-part of Ser. No. 923,085, Jul. 31, 1992, Pat. No. 5,367,572, and a continuation-in-part of Ser. No. 712,186, Jun. 7, 1991, Pat. No. 5,237,614.

[51] Int. Cl.[6] ........................................ H04L 9/32
[52] U.S. Cl. ................... 380/23; 380/24; 380/25; 380/49; 380/30; 340/825.31; 340/825.34; 235/379; 235/380; 235/382
[58] Field of Search ....................... 235/379, 380, 235/382; 380/4, 30, 23–25, 49, 50; 340/825.31, 825.34

[56] References Cited

U.S. PATENT DOCUMENTS

| | | | |
|---|---|---|---|
| 4,614,861 | 9/1986 | Pavlov et al. | 235/380 |
| 4,697,072 | 9/1987 | Kawana | 235/380 |
| 5,180,902 | 1/1993 | Schick et al. | 235/380 |

*Primary Examiner*—Bernarr E. Gregory
*Attorney, Agent, or Firm*—Wolf, Greenfield & Sacks

[57] ABSTRACT

A method and apparatus are provided for enhancing security for a private key or other multibit secure token code stored in a token by (a) assuring that the secure token code is not stored in the token except for short intervals when the token is actually in use by an authorized user and (b) by assuring that the secure token code cannot be obtained from the token except by an authorized user. This is accomplished by algorithmically combining a PIN or other secret code memorized by the user with the secure token code, either in the token or at a suitable terminal, to generate a meaningless multibit sequence/token secret which is stored in the token. The multibit sequence stored in the token is selected such that when it is algorithmically combined with the secret memorized code known only to the user, either in the token or at a terminal, it produces the private key or other secure token code.

38 Claims, 5 Drawing Sheets

PRIVATE KEY    1101110010100011101001···
PIN-10101      1    0    1    0    1···DEVICE CODE 101
TOKEN SECRET   0101110010000011101000···

TOKEN SECRET   0101110010000011101000
PIN            1    0    1    0    1
PRIVATE KEY    1101110010100011101001

| PRIVATE KEY | 1101110010100011101001... |
| TOKEN SECRET | 1010101100101... |
| TOKEN SECRET | 0111011110001011-01001... |

| TOKEN SECRET | 0111011110001011101001... |
| PIN | 1010101100101... |
| PRIVATE KEY | 1101110010100011101001... |

ENHANCED SECURITY FOR A SECURE TOKEN CODE

CROSS-REFERENCE TO RELATED APPLICATIONS

This application is a continuation-in-part of U.S. patent application Ser. No. 07/923,085 filed Jul. 31, 1992 for METHOD AND APPARATUS FOR PERSONAL IDENTIFICATION and of U.S. patent application Ser. No. 712,186 filed Jun. 7, 1991 for INTEGRATED NETWORK SECURITY SYSTEM the disclosures of which are incorporated by reference herein, now U.S. Pat. Nos. 5,362,522 and 5,237,814 respectively.

FIELD OF THE INVENTION

This invention relates to systems which utilize a private key or other secure code stored in a token and more particularly to a method and apparatus for providing enhanced security for such a secure token code.

Glossary of Terms Used

In the following discussion, the various terms listed in this glossary shall be considered to have the meaning indicated for such term unless specifically otherwise indicated:

1. Terminal—a data entry device with some processing capability.
2. Token—a device which is usually portable and/or personal (but is not limited to being either) and which stores machine and/or visually readable data which is usually secret; nonlimiting examples of tokens are a credit card, smart card, photo-optical data storage card, floppy disk, touch memory button, data key, processor memory component (i.e. RAM, ROM, electronically alterable memory), other data-containing electronic component, other data-containing IC chip, or the like.
3. PIN—a secret, normally memorized, personal identification number.
4. Secret Code—any password, PIN, prose phrase, alphanumeric code, or other code which is kept secret and is known to (normally memorized by) an authorized individual.
5. Secure Token Code—a long code, typically several hundred to several thousand bits in length, but sometimes substantially less (for example 64 bits) which is nearly always secret and may be stored in some form in a token; examples include encryption key, private key, biocharacteristic template data, data, confidential information or the like.
6. Multibit Token Secret—an algorithmically modified secure token code which may be stored in some form in a token and which has no value by itself, but from which the secure token code may be algorithmically derived.
7. Device Code—data stored with a processor or other device which is typically secret and unique to the device.
8. Combining Algorithm—a set of mathematical rules which allow one or more secure token codes to be combined with one or more secret codes (and possibly with device codes or under control of device codes) to produce multibit token secrets, which multibit token secrets may be combined using a combining algorithm which is preferably the same as that for the original conversion, but which may be different, and which may involve other codes such as device codes, to produce the secure token code.
9. Two Factor—a requirement that identity verification, access control or beneficial use by an individual of a secure object, container or facility require some combination of something known, something possessed or a biometric characteristic.
10. Two Token/Multitoken Access—a requirement that multibit token secret, and preferably secret code, from two or more users (or devices) be required to obtain a secure token code or other code required for beneficial use of a secure object or facility (for example, see ANSI Standard X9.17-1985).

Background of the Invention

There are many applications where a secure code which is of a length greater than what an individual would normally memorize, for example several hundred to several thousand bits, is stored in a token in the possession of an authorized individual, which token is preferably machine readable. Such secure token codes may, for example, be an encryption key which may be unique to the individual having the token or to a small group of individuals possessing tokens. In particular, such secure token code may be the private key for the individual in a private/public key encryption system. Such systems have been available for some years and the general methodology for such systems is well known, being described, for example, in "A Method for Obtaining Digital Signatures and Public-Key Cryptosystems", R. L. Rivest, A. Shamir, and L. Adleman, Communications of the ACM, February 1978, Volume 21, No. 2, pp 120. However, such secure token codes requiring protection are by no means limited to encryption keys. Such secure codes may also be long security codes used to gain access to, for example, a secure facility or computer, or might be other secure data which permits the user of the token to perform certain functions or to engage in certain transactions which are permitted or facilitated by the presence of the secure token code. Thus, portable tokens such as smart cards may be used to transport and/or to perform calculations with stored encryption keys, passwords and other data (such as voice and fingerprint templates) and are increasingly used to authenticate the identity of an individual by his physical possession of the token. This trend will continue as both business and personal functions become increasingly computerized.

However, there are a number of problems with relying on the mere possession of a token to authenticate an individual. First, if the token is lost or stolen, the user loses all privileges associated with possession of the token and, for example, if information was encrypted using the encryption key in the token, there may be some difficulty, or as a minimum some time and expense involved in retrieving such data. More important, if the token is surreptitiously and temporarily appropriated without the knowledge of the owner, its use can be clandestinely exploited for some period of time before such misuse is detected, if ever. This may result in the compromising of secure data either by permitting access to such data in a secure system and/or by permitting the decryption of such data. It may also permit access to funds or have other undesired consequences. A similar problem arises if the token is stolen, at least until such theft is detected, or if the secure code stored in the token is read out using various sophisticated techniques currently available for permitting such reading out to occur. This may permit the token to be counterfeited and used surreptitiously in undesired ways. A particular problem is that compromising of an encryption key can permit access not only to future encrypted data, but also to a volume of data which was previously stored and/or captured in an encrypted form.

Thus, of the three factors available for providing secure identity verification, namely, something an individual possesses, something an individual knows, and something the individual is (a biocharacteristic), the standard token provides only the first of these factors. In an effort to enhance security, some tokens, in the form of smart cards, have also stored a password or personal identification number (PIN) or its hashed representation. Some such cards may have an input pad permitting numbers (or other characters) to be entered into the card and compared against the stored PIN (or a stored representation thereof) in the token. If there is a correct match, the processor in the token either permits the secure token code stored therein to be read out or permits the token to perform other desired functions utilizing the secure token code. Alternatively, the token may be presented to a token reader at a terminal which reads out the PIN (or representation). The terminal contains a processor which then compares the PIN (or representation) read out from the token with a PIN inputted to the terminal by the user and permits other functions at the terminal or processor to be performed only if such comparison is successful.

However, the above is not a total solution to the problem since someone in possession of the token may, using sophisticated techniques known in the art, be able to capture the PIN or password stored in the token as well as the secure token code stored therein. Such surreptitious reading might, for example, be accomplished employing an electron microscope equipped to measure charges at a distance.

A need, therefore, exists for an enhanced technique for providing security for a secure token code which is to be stored in machine or other readable form in a token in possession of an authorized individual. Such technique should afford at least two factor security and should assure that anyone coming into possession of the token will be unable to learn from the token itself, regardless of how sophisticated the efforts to read data from the token are, either the secure token code or any user PIN, password, etc. Such techniques should also permit the user to easily change the PIN or password used to enable the token in the event the user feels his PIN or password may have been compromised without requiring the issuance of a new token, the generation of a new secure code, or any reencryption of data. Where the token is being used in a public/private key system, no administrative effort should be required to replace copies of the public key which have been disseminated and stored in wide and diverse locations. Finally, such a technique should be adaptable for use in systems where the simultaneous presence of two token/multitoken access systems, in systems where security is enhanced by also utilizing a device code or device dependent code in conjunction with the code from the token to generate the secure token code or encryption key, and in systems where a third factor, for example, a biocharacteristic, may also be required for generation of the secure code or encryption key.

Summary of the Invention

In accordance with the above, this invention provides a technique for obtaining a multibit secure token code, which code may be hundreds to thousands of bits long, from a token, which technique is relatively simple to implement, which provides at least two factor security, and which assures that neither the secure token code nor the PIN, password or other secret code which is utilized to provide the second factor security is stored in the token except possibly during short intervals when the token is in use by the authorized user. More specifically, what is stored in the token is a multibit token secret or sequence which, when algorithmically combined in a particular way with the secret code of the authorized user, produces the secure token code. The algorithmic combination to generate the secure token code may either be performed in the token, and the secure token code temporarily stored therein, or such calculations may be performed at a terminal or processor, with the user inputting his secret code to the terminal or processor and a token reader at the terminal or processor reading the multibit token secret from the token.

The multibit token secret or sequence stored in the token may be generated in a number of ways. In particular, the token may initially have the secure token code stored therein and this code may be replaced by the multibit token secret by performing a combining algorithm in the token to algorithmically combine the stored secure token code and an inputted secret code. Alternatively, the stored secure token code may be read out from the token into a terminal or processor into which the secret code is also inputted, with the algorithmic combination being performed in the terminal or processor. In either event, the multibit token secret, once generated, is then stored in the token in place of the secure token code. A unique input may be required at the token or the terminal/processor to trigger the generation of the multibit token secret. It is also possible to change the multibit token secret stored in the token when the secure token code has been generated and is, for example, stored in the token, by providing the unique input followed by a new secret code, which is then utilized in conjunction with the secure token code to generate the new multibit token secret. The new token secret when algorithmically combined with the new secret code, will produce the secure token code.

Where the token contains a processor which is responsive to an initial input of the secret code, preferably preceded by a predetermined input, for generating the multibit token secret, the processor is preferably also responsive to subsequent inputting of the secret code for algorithmically combining the multibit token secret with the secret code to obtain the secure token code. In such circumstances, the secure token code is zeroized or otherwise removed from the token under selected conditions, leaving the token with only the multibit token secret. Such removal may occur by merely zeroizing or erasing the secure token code when both the secure token code and the multibit token secret are simultaneously stored on the token or, when the secure token code is to be removed, it may be recombined algorithmically with the secret code to generate the multibit token secret. The removal of the secure token code may, for example, occur a selected period of time after the generating of the secure token code or after the token has been read or used by a token reader. Further, where the token has a processor and has the secure token code stored therein, and where such code is an encryption key such as, for example, a private key, input-output means may be provided for data to be applied to the token for encryption or decryption and the processor in the token may include means, for example software, for utilizing the encryption key/private key to operate on inputted data to perform encryption/decryption thereon. The token may thus function as a transportable encryption engine which is more or less processor independent, but can only be used by an authorized user and/or with an authorized device.

Where the token utilized does not have input keypads, the multibit token secret stored in the token may be read out at a terminal or processor by a suitable token reader, the secret token code inputted on an input device at the processor and the processor utilized to algorithmically combine the received multibit token secret and the secret code to generate and store the secure token code. For preferred embodiments, the multibit token secret is generated by exclusive ORing bits of the secret code with selected bits of the secure token code. Such exclusive ORing can occur with only selected bits of the secure token code since the secure token code is generally substantially longer than the secret code. The actual bits used for such exclusive ORing may be predetermined as part of the processor algorithm, may be determined in response to a device code stored in or with the processor or may be otherwise determined. When the multibit token secret is generated in this way, the secure token code may be retrieved by subsequently exclusive ORing the bits of the secret code to corresponding selected bits of the multibit token secret. In some applications, algorithms other than exclusive ORing may also be beneficially utilized.

The processor for generating the secure token code may do so in response to the receipt of multibit token secrets from at least two tokens which may be received through a single or multiple token readers. When a single token reader is utilized, the multibit token secrets are received serially at the processor, while where there is a token reader for each token utilized, the multibit token secrets from the tokens may be received in parallel at the processor. A secret code may be inputted at the processor for each token or, where there is an input device which is a part of each token, the secret code may be inputted at the token and utilized to generate an intermediate code which is inputted to the processor.

Where the processor performing the combining algorithm or the device containing such processor has a multibit device code, this code may also be utilized in the algorithm in addition to the multibit token secret and the secret code in generating the secure token code.

The invention also includes a token having the multibit token secret stored therein, which token is produced utilizing one of the techniques described above and may also include the various methods and apparatus for producing such token and/or for utilizing such token.

The foregoing and other objects, features and advantages of the invention will be apparent from the following more particular description of preferred embodiments of the invention as illustrated in the accompanying drawings.

IN THE DRAWINGS

DETAILED DESCRIPTION

The teachings of this invention may be utilized in a large number, and in an ever-increasing number of applications where some control is required for access to a processor or processor system, where encryption or other security is required for data available on or through such processor or system where funds or something else of value are being transferred through use of such system, or in other secure data processing applications. One technique which is increasingly used in such secure applications is public/private key encryption and the following discussion of preferred embodiments will be with reference to such a system. However, it should be emphasized that this invention is in no way limited to public/private key encryption applications, and may be used in any application where a secure token code, generally one containing a large number of bits, such as, for example, an encryption key, is stored in a token in possession of an authorized individual and there is a need to protect such code in the event the token is lost or either temporarily or permanently misappropriated.

In public/private key encryption systems, each user of the system is assigned both a private key, which is normally a long sequence of several hundred to several thousand bits and is typically stored in some form of token, and a public key which is either printed or electronically available in a directory. The two keys interact in a manner such that information which the user sends to another party which is encrypted using the other parties' public key may be decrypted using the other parties' private key and vice versa. If a person encrypts his name, a checksum, a message authentication code (MAC), or other authentication code with his private key, a person receiving the message and decrypting the authentication code using the sender's public key can in this way verify that the message being sent is in fact from the alleged individual and/or that the information integrity has not been altered. This is a simple way of verifying the identity of a person giving instructions, for example, for funds transfer, and/or message integrity, in a computer or other electronic environment, where physical, visual signature verification normally used for such transaction is not possible.

However, as discussed above, the security of such systems can be compromised if the token containing an individual's private key is lost or even temporarily misappropriated. The following discussion will be with respect to a technique for assuring that, quite literally, "He who steals my token steals trash".

Figure 1:
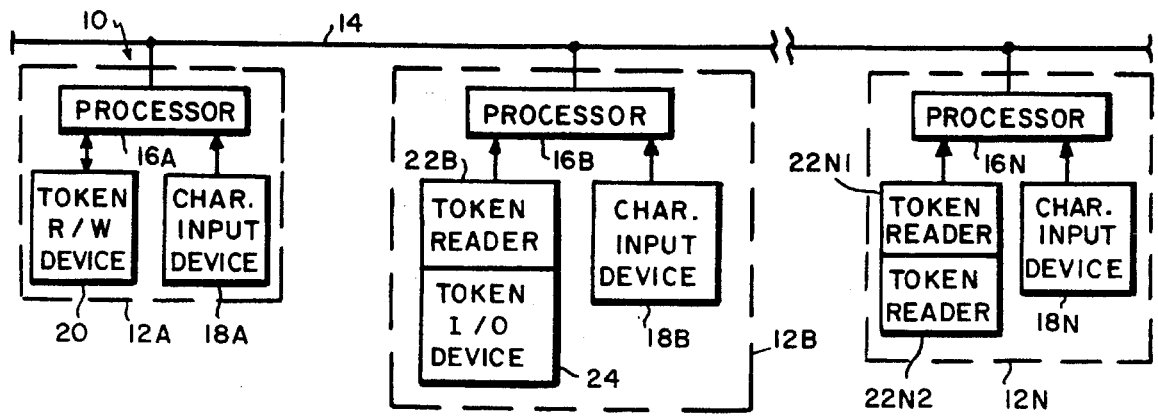
FIG. 1 is a block diagram of an illustrative system which may be utilized in practicing the teachings of this invention.

Referring to FIG. 1, an exemplary system 10 is shown having three terminals 12A, 12B and 12N. While in FIG. 1 the three terminals are shown connected to a common bus 14 over which terminals may communicate with each other, this is by no means a limitation on the invention, and the invention could also be practiced with stand alone terminals or in more complex networks. Each terminal 12 includes a processor 16A–16N, respectively, and a character input device 18A–18N, respectively. Processors 16 could be PC's or other special or general purpose processors, and the particular processor utilized will vary with application. Each processor 16 would contain suitable storage elements and other suitable hardware and software. Character input device 18 would typically be a keyboard of some type, but other character input devices available in the art could also be utilized. In addition, terminal 12A is shown as having a token read/write device 20. Terminal 12B has a token reader 22B and also has a token I/O device 24, both token reader 22B and token I/O device 24 communicating with processor 16B. Terminal 12N has a pair of token readers 22N1 and 22N2. Thus, terminal 12A may be used for reading the private key or other secure token code on the token or for modifying the code stored on the token. Terminal 12B has a token reader 22B which is only used to read the secure code on the token, but also has a token I/O device which may be used for receiving data from processor 16B to be encrypted/decrypted or otherwise processed in a token contained processor in a manner to be described later through use of the private key and to outputting the processed data from the token to processor 16B. Terminal 12N illustrates a situation where two tokens are required in order to gain access to processor 16N or to certain information contained therein or in order to encrypt or decrypt data for use with processor 16N. While for purposes of illustration three different terminals are shown in FIG. 1, terminals which may be utilized with the system are in no way limited to these three possibilities. Thus, a special terminal may be provided which is like terminal 12A which is used strictly for the generation of tokens.

Figure 2A:
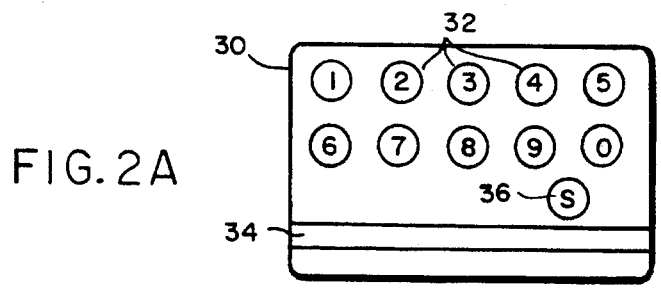
FIG. 2A is a front view of a card suitable for use as a token in practicing the teachings of this invention.

FIG. 2A illustrates a token 30 in the form of a "smart card" which may be utilized in practicing the teachings of this invention. Token 30 has a number of keypads 32 which may, for example, represent various numerical digits. In FIG. 2A, 10 such key pads are shown representing the digits 0–9. A machine readable area 34 is also shown on card 30 which may, for example, be a magnetic stripe; however, for most applications, a more secure type of machine readable media would be provided, such more secure machine readable storage elements being known in the art. Card 30 may also have a liquid crystal or other display area for displaying all or a portion of a code stored in the card under certain circumstances and may also have a special key pad area 36 which may be used in various manners to be described later.

Figure 2B:
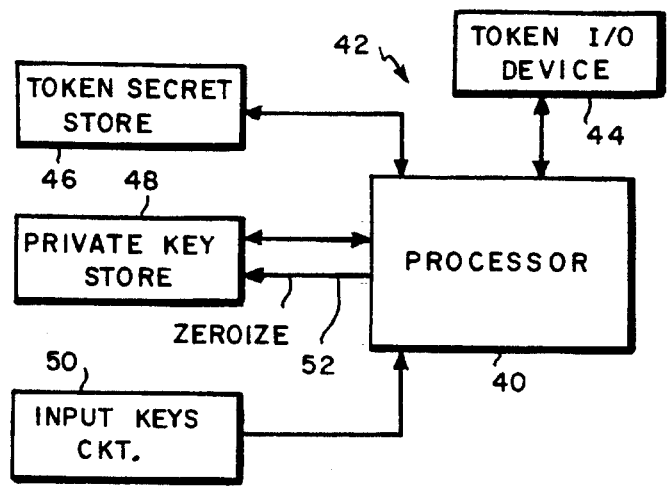
FIG. 2B is a schematic block diagram of circuitry suitable for use in a token utilized in practicing the teachings of this invention.

Smart card 30 contains a processor 40 and other selected circuitry, FIG. 2B being an illustration of circuitry 42 suitable for use in a card or token 30. In addition to processor 40, the circuit 42 includes a token I/O device 44 which may be utilized for feeding data into the card, for example to be encrypted or decrypted, and for removing the processed data from the card. The circuit also includes a first storage device 46 for storing a modified multibit sequence (i.e. multibit token secret), the function of which will be described later, a second storage device 48 in which the private key may be stored and an input key circuit which includes the key pads 32 and 36. Bidirectional communication exists between token I/O device 44 and processor 40, between sequence store 46 and processor 40 and between private key store 48 and processor 40. Processor 40 also sends a zeroize input to store 48 over line 52. Circuit 50 only provides input to processor 40.

As previously discussed, in accordance with the teachings of this invention, a PIN or other secret code known to the user is not stored in token 30 and the private key is also not normally stored in the token, the token instead containing a multibit token secret or sequence stored in token secret store 46 which, when algorithmically combined with the user PIN, will generate the private key for the user.

Figures 3, 8A, 8B:
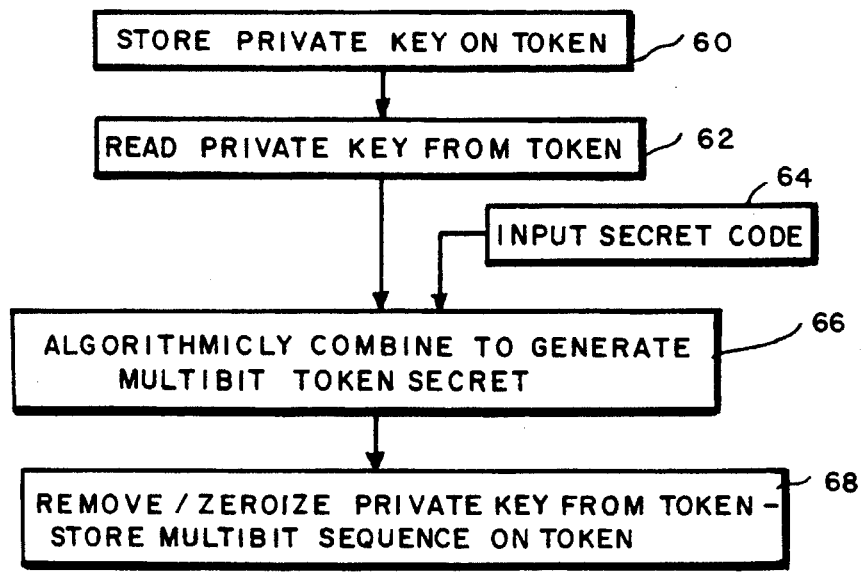
FIG. 3 is a flow diagram of an illustrative process for generating a multibit token secret utilizing a terminal or processor.
FIGS. 7A and 7B and FIGS. 8A and 8B are diagrams illustrating the process for converting from a secure token code to a multibit token secret and from a multibit token secret to a secure token code, respectively, utilizing preferred techniques in accordance with the invention.

FIG. 3 is a flow diagram illustrating the process of generating the multibit token secret from the user's private key, using a special terminal or a computer terminal such as terminal 12A to perform this function. The first step in this operation, step 60, is to store the user's private key in the token. This would typically be done at a secure facility where such private keys are computer generated using techniques known in the art and described, for example, in the Rivest et al article previously indicated. The user, on receiving the token, takes the token to a special terminal such as terminal 12A which would typically also be a secure terminal. During step 62, the user inserts the token in a suitable token read/write device 20 which reads the stored private key from private key store 48 (FIG. 2B). While throughout the description it is assumed that the token is machine readable so that it may be automatically read by a suitable reader, this, while preferable, is not necessarily a limitation on the invention. If the token is not machine readable, the private key may, for example, be displayed in suitable form, for example as characters on a token display and manually inputted at a terminal by the user.

Figures 4, 7A, 7B:
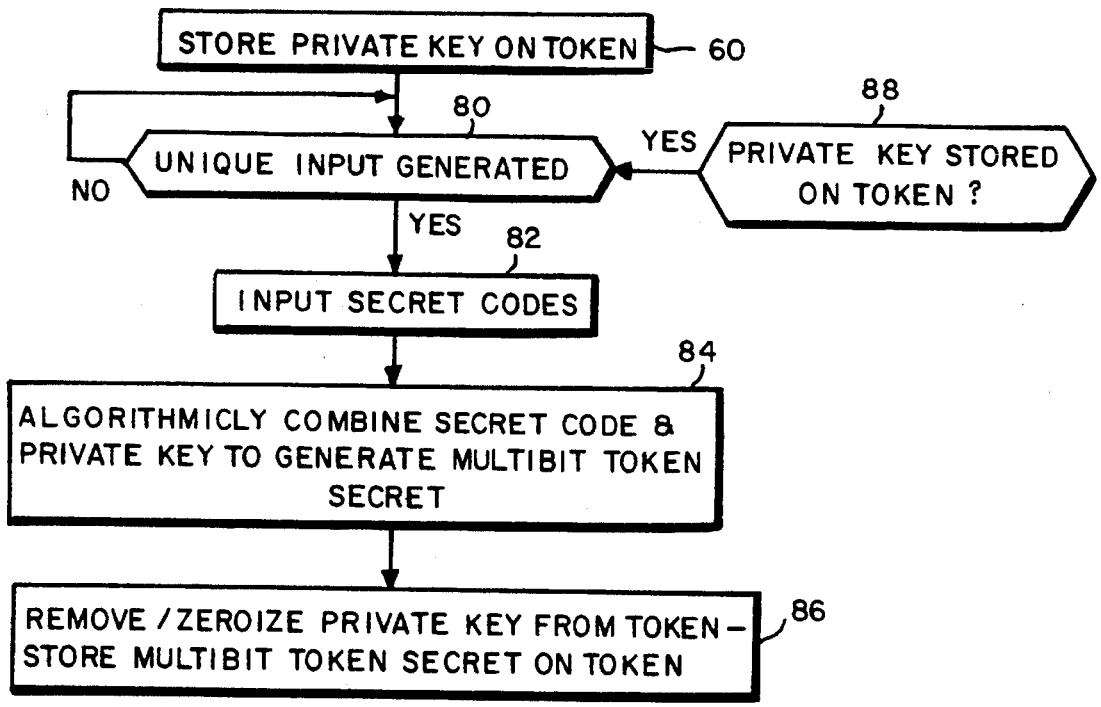
FIG. 4 is a flow diagram of an illustrative process for generating a multibit token secret in a token utilizing a processor contained in the token.

Before, after or during the reading of the token, the user also inputs his secret PIN or other secret code using character input device 18A (step 64). Processor 16A then combines the inputted private key from token reader 20 and the inputted PIN or other secret code from input device 18A during step 66 to generate an algorithmically altered private key which is also referred to hereinafter as a multibit sequence or multibit token secret. For preferred embodiments, this is accomplished by exclusively ORing at least selected bits of the private key with bits of the PIN. Since the private key normally has many more bits than the PIN, only selected bits of the private key may, in fact, be exclusively ORed with bits of the PIN, and part of the algorithm may be the selection of the actual bits to be combined. FIGS. 7A and 8A illustrate the combining process where binary bits are being utilized, including two possible ways of determining the bits which are to be combined.

Referring to FIG. 7A, 21 bits of a private key sequence are shown, it being understood that such sequence would typically be 10 to 100 times that long (i.e. several hundred to several thousand bits). Thirteen bits of a PIN are also shown, again it being understood that the PIN would typically also be much longer. A remembered PIN might, for example, be five or six eight-bit characters long (i.e. 40 to 48 bits). However, since this would permit only a very limited number of the private key bits to be exclusive ORed, a longer PIN is desirable. Unfortunately, individuals have difficulty remembering long number sequences. One way around this provided in accordance with the teachings of this invention, particularly where an alphanumeric input keyboard is available, is for the PIN to be a common phrase, for example, "The cow jumped over the moon" which contains a much larger number of characters (for example, 23 characters/184 bits for the example given), while still being easily remembered. Longer phrases can be used if more bits are required. Thus, the level of security can be scaled as required.

Since, in any event, there will be commonly less bits in the PIN than in the private key, some criteria must be utilized to determine the bits of the private key which are exclusive ORed or otherwise combined with bits of the PIN. In FIG. 7A, the criteria used is to simply exclusive OR the first N bits of the private key with the N bits of the PIN. In FIG. 8A, the device code for the device doing the process, in this case the code for processor 16A, is used to perform this function. Thus, if the device code is a binary five as shown in FIG. 8A, the bits of the PIN are combined with every fifth bit of the private key as shown to generate the stored sequence, the combining being an exclusive ORing, which is an adding without carry operation for binary bits. The device code may also be used in other ways (for example, as a template) for the algorithmic combining of the private key and PIN and/or may itself be combined with either one or both of these values, using a combining algorithm stored in processor 16A, to provide the multibit token secret. While the exact combining algorithm utilized for generating the multibit token secret is not critical, what is critical is that it be possible, by algorithmically combining the token secret and the PIN (and, where utilized, the device code) to reobtain the private key. The way this is accomplished where the algorithmic combining is an exclusive ORing operation (addition without carry for binary bits) will be described later.

While, as indicated above, exclusive ORing is the preferred combining algorithm, other combining algorithms known in the art might also be utilized. For example, an algorithm as complex as that described in "How to Share a Secret" by Adi Shamir; CACM, Vol. 22, No. 11, pp 612–613, November 1979, may be beneficially utilized in some applications. A biocharacteristic or the like may also be utilized in the combining algorithm either in addition to or instead of the device code for enhanced security in appropriate applications.

When the multibit token secret has been generated doing step 66, this bit sequence is stored in token secret store 46 during step 68 and the private key previously stored in store 48 is zeroized, erased or otherwise removed from store 48 by a signal on line 52 from processor 40. Alternatively, a single store may be provided where private key 48 is initially stored and where the modified private key or token secret is stored doing step 68. Once step 68 has been completed, what is stored in token 30 is a meaningless bit sequence (i.e. the token secret) which is of little, if any, value to anyone who either accidentally or intentionally comes into possession of the token, and the only person who can make beneficial use of the token is the authorized individual who knows the secret PIN or other memorized secret code.

In addition to generating a multibit token secret to be stored in token 30 when the token is first received, terminal 12A may also be utilized to change the multibit token secret in the event the individual feels that his PIN or other memorized secret code has been compromised. The PIN and token secret may also be changed at selected intervals to provide enhanced system security and the system could be set up such that a token or the code stored therein cannot be used if the PIN and token secret have not been altered. As will be discussed later, terminal 12A may also be utilized to reproduce the private key from the stored token secret in response to an entered PIN and to temporarily store this private key, generally in a memory of processor 16A. Any time the private key is stored in the processor, a memorized secret code may be inputted on input device 18A and terminal 12A may be instructed by operating a suitable input at the terminal, for example a special key or other input at the terminal or an instruction sequence from a keyboard input device, to cause step 66 to be performed. If a new PIN has been inputted during step 64, the resulting code sequence outputted and stored during step 68 will be a new token secret which, when combined with the new PIN, will again generate the private key. However, since the private key remains unchanged, the change in PIN and change in token secret stored in the token may be effected without making any changes in the underlying system, without requiring the issuance of a new token, without requiring the publishing of a new public key (i.e. without changing the widely disseminated public key) and without requiring any data to be reencrypted.

While in FIG. 3 the generation of the bit sequence to be stored in token 30 is performed at a special terminal such as terminal 12A, it is also possible for this process to be initially performed at the secure processor where the private key is generated, this processor also having access to the user PIN, and for the token received by the user to already have only the token secret stored therein. This is advantageous since the token secret is useless alone and the possibility of the private key being misappropriated before the user performs the steps of FIG. 3 is eliminated. Alternatively, the operation could be performed directly in token 30 by the user without the use of any external terminal. FIG. 4 is a flow diagram of this process.

Referring to FIG. 4, the first step, step 60, is the same as step 60 in FIG. 3 wherein a private key is stored on the token. During the next step, step 80, a determination is made as to whether a unique input has been generated in the token. This input may, for example, be the operation of special key 36, may be the operation of some special key sequence of the keys 21, or may be some other selected input. When a private key is in the token and the unique input is generated during step 80, the operation proceeds to step 82 during which the secret code or PIN is inputted using, for example, key pads 32. The stored private key and the inputted secret code are then algorithmically combined during step 84 to generate the multibit token secret. Step 84 would be performed in substantially the same way as step 66 of FIG. 3 with processor 40 (FIG. 2B) containing the algorithm which determines the bits of the private key which are combined with bits of the PIN, for example by addition without carry, in order to generate the token secret. When the multibit token secret has been generated, the token secret is stored in store 46 and the private key in store 48 is zeroized or otherwise removed from the store (step 86).

The operation described above may be repeated for a new PIN/secret code anytime it is determined that the private key is stored in the token (step 88) and the unique input is generated during step 80. Thus, as for the situation where the multibit sequence is generated at terminal 12A, the user may select a new PIN or other secret code and use this new PIN or secret code to generate a new multibit token secret for storage on token 30 without in any way altering the private key or public key or in any other way impacting the system. The bit sequence which is stored in the token is thus totally meaningless alone to the system and is not stored or in any other way known to system 10, the only significance of the bit sequence token secret being that, when algorithmically combined with the PIN or other secret code known to the authorized user, it may be used to produce a usable private key or other secure token code.

Figure 5:
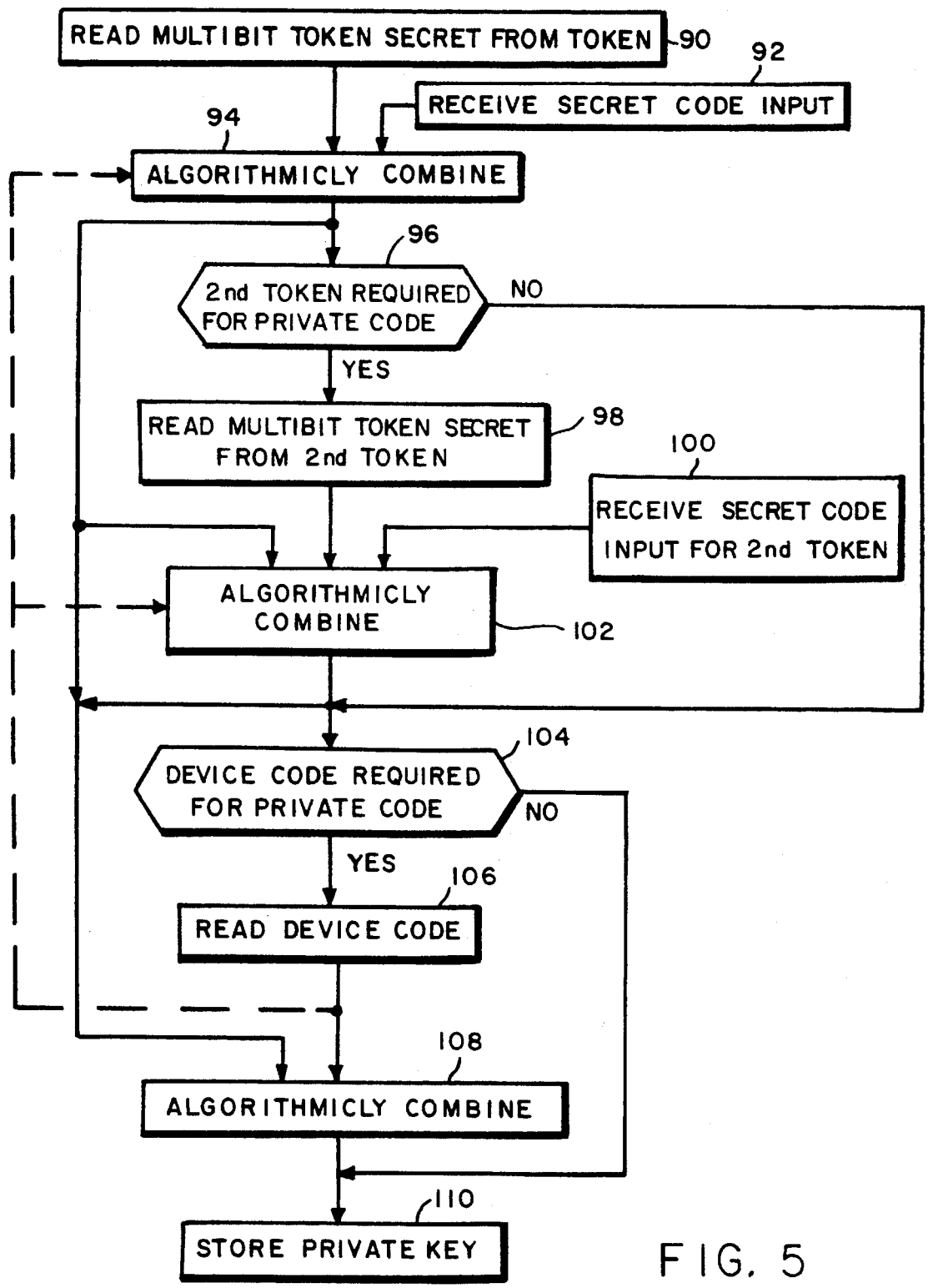
FIG. 5 is a flow diagram of an illustrative process for obtaining a private key from a multibit token secret or sequence stored in a token using an external processor.

FIG. 5 illustrates how token 30 may be utilized at one of the terminals 12 to obtain the private key for utilization thereat. The process is started at, for example, terminal 12B by inserting the token into token reader 22B and having the multibit token secret stored therein read out from the token into processor 16B (step 90). The user then inputs his secret PIN or other secret code at character input device 18B during step 92 and these values are algorithmically combined during step 94. FIG. 7B illustrates the algorithmic combining step where the stored token secret is generated in accordance with FIG. 7A and FIG. 8B illustrates the algorithmic combining step where the token secret is generated in accordance with FIG. 8A. In FIGS. 7B and 8B, the bits of the PIN are selectively combined with bits of the stored sequence, the combining being an addition without carries, to obtain the private key. If the same device is used in both generating the stored token secret and in restoring the private key (FIG. 8B), a device code for such device could be utilized to determine the bits of the stored sequence with which the bits of the PIN are combined. As with the generation of the token secret, the device code itself could also be used as part of the input to the combining algorithm which uses this input in conjunction with the secret code and the token secret to regenerate the secure token code. Otherwise, the specific bits being used for the combining operation could be part of the algorithm being used to generate the private key (see, for example, FIGS. 7A and 7B). Where an algorithm other than exclusive ORing is utilized to generate the token secret, such other algorithm would typically also be utilized to recreate the private code.

FIG. 5 illustrates a number of options which may or may not be present in all situations. For example, in some applications, access to a processor or to selected data therein, or the performance of a selected transaction, for example a large financial transfer, may require two inputs rather than a single input. In these situations, the tokens for the two users may either be read serially using a single token reader such as token reader 22B of terminal 12B or the two tokens may be read in parallel using two token readers, for example token readers 22N1 and 22N2 of terminal 12N. In any event, from step 94, the operation proceeds to step 96 to determine if a second token is required in order to generate the desired private code. If a "yes" output is obtained during step 96, the operation proceeds to step 98 during which the multibit token secret for the second token is read. While from FIG. 5 it appears that steps 90 and 98 are performed sequentially, as discussed above, these steps may be performed in parallel. The secret code for the second token is also inputted at, for example, character input device 18N during step 100 and the algorithmically combined output from step 94 is then combined with the multibit token secret read from the token during step 98 and the secret code inputted during step 100, this algorithmic combining occurring during step 102. Alternatively, the multibit sequence obtained during step 98 and the secret code obtained during step 100 may be algorithmically combined and the results of this algorithmic combining step then combined with the results of algorithmic combining step 94 to generate the private code. A third alternative is for step 94 to be eliminated and for the inputs obtained during steps 90, 92, 98 and 100 to all be applied to the processor 18 during step 102 and to be algorithmically combined in a single operation to generate either the private key or an intermediate code which is utilized during the steps to be now described.

One way in which device codes may be utilized algorithmically in generating the private code has been previously discussed in conjunction with FIG. 8B. To the extent device code is utilized in generating the private code, either in the manner discussed in conjunction with FIG. 8A or otherwise, this issue is addressed during step 104 which may be entered either as a result of a "no" output during step 96 or from step 102. If a determination is made during step 104 that device code is to be used in generating the private code, thus assuring that the token user only has access to authorized devices, a device code is read from a suitable register or other location in the processor 16 during step 106. The device code read during step 106 may be applied back to be utilized, for example in the manner previously described, during step 94 or to be used in a similar way during step 102 as illustrated by the dotted lines, or the device code may be used during step 108 in conjunction with the output value previously generated during step 94 or 102 to generate the private key. If the device code is used during step 94 and/or step 102, step 108 may be eliminated.

From step 104 if a "no" output is generated during this step, or from step 108, the operation proceeds to step 110 to store the private key which has been generated. The stored private key may then be used in processor 16 to perform encryption/ decryption or for other functions known in the art. When the processor is through using the private key, the private key is preferably zeroized or otherwise removed from the processor to prevent its misuse or misappropriation.

Figure 6:
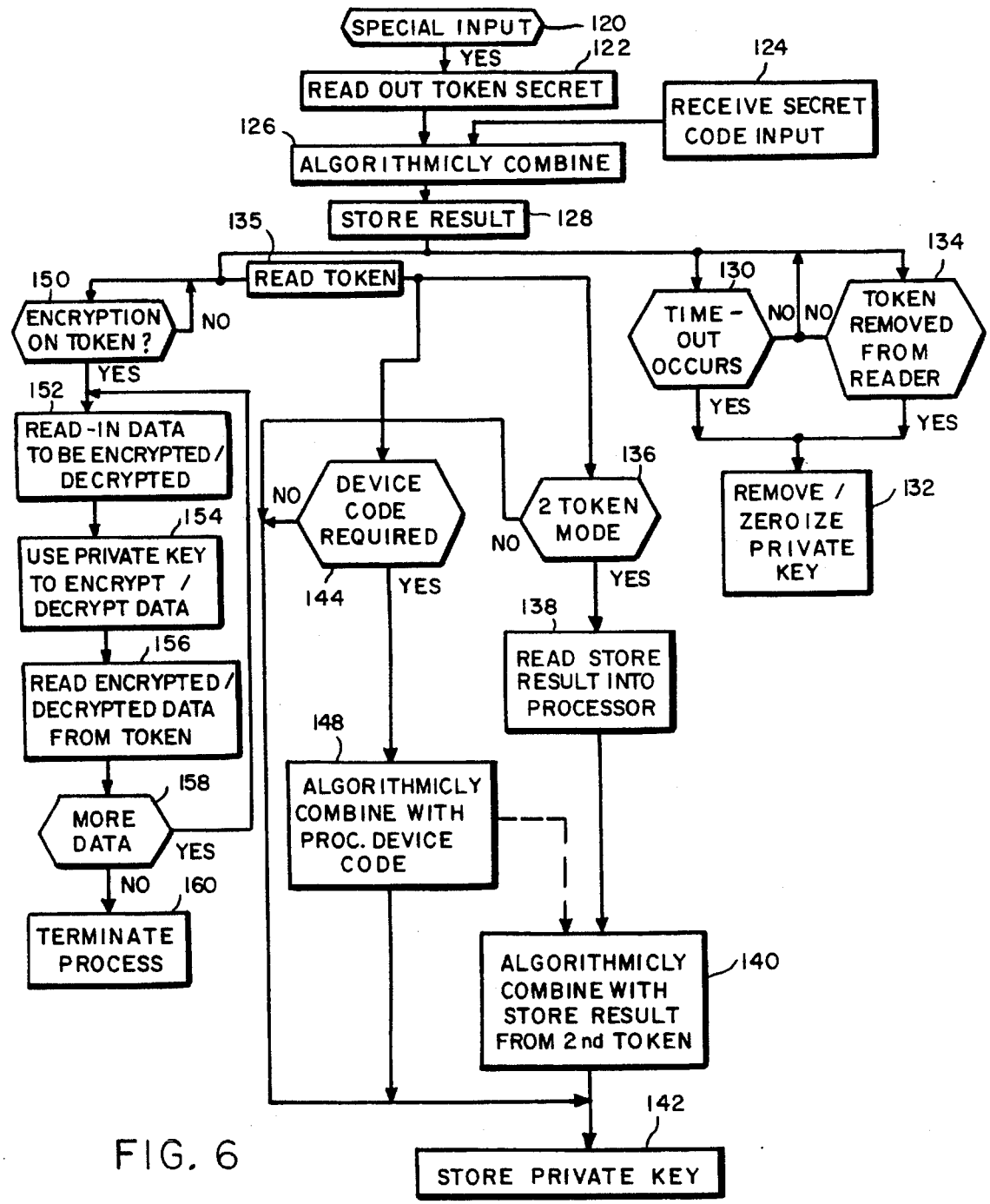
FIG. 6 is a flow diagram of an illustrative process for generating a private key from the stored multibit token secret or sequence in a token using at least in part a processor contained on the token and for some uses of such private key.

FIG. 6 illustrates the sequence of operations which may occur for embodiments where the token 30 is a "smart card" or other token having processor capability which permits the private key to be generated in the token when its use is desired rather than in a processor 18. The process of FIG. 6 is initiated during step 120 when a determination is made that a special input has been received indicating that it is desired to generate the private key. As previously indicated, such input may be the operating of a selected special key pad such as key pad 36 (FIG. 2A) or may be a unique key pad combination which is recognized by processor 40 as indicating a desire to generate the private key from the stored multibit token secret.

When a "yes" output is obtained during step 120, the operation proceeds to step 122 to read the multibit token secret from store 46 into processor 40. In addition to operating the special input, the user also inputs his secret PIN or other secret code by use of key pads 32 and this value is also applied to processor 40 (step 124). During step 126, processor 40 combines the received inputs, for example in the manner shown in FIG. 7B, utilizing an algorithm contained in processor 40 to obtain the private key which is stored in private key store 48 during step 128.

Since in accordance with the teachings of this invention, it is important that the private key be stored in token 30 for only so long as such key is required, FIG. 6 illustrates two ways in which the private key may be zeroized or otherwise removed from the token, it being understood that other techniques might also be utilized in suitable applications. The first way in which the private key may be removed is for such removal to occur at a predetermined period of time after the private key is originally generated and stored. Thus, from step 128, the operation branches to step 130 to determine if a time-out period has passed. Depending on application, this period may vary from several minutes to several hours. If the time out period has not passed, the operation proceeds. If the time out period has passed, the operation branches to step 132 during which a signal is applied to line 52 to zeroize or otherwise remove the private key from store 48. Alternatively, where only a single store is provided for both the private key and the multibit sequence, during step 132 the private key would be combined with a stored PIN or other secret memorized code to generate the token secret which would be stored and both the private key and the stored PIN would then be zeroized.

Alternatively, where the token is placed in a token reader such as a device 20 or 22, step 134 could be performed to detect if the token is still in the reader and the operation could branch to step 132 to remove or zeroize the private key when it is detected that the token has been removed from the reader. Other options would be to detect the reading out of the private key into a processor 16 and to zeroize the private key on token 30 as soon as this occurs. Other options for zeroizing the private key will also be apparent to those skilled in the art.

AS previously discussed in conjunction with FIG. 5, it is possible that the value generated during step 126 is an intermediate value rather than a true private key to be used for encryption and that such private key can only be obtained by a processor 16 from the inputting of two tokens. Thus, during step 135 a token is read by a processor 16, and during step 136 a determination is made in the processor as to whether the system is in two token mode. If the system is in two token mode, the operation proceeds to step 138 to read the stored intermediate results obtained during step 128 for a second token. As previously discussed, this may be accomplished serially with a single token reader or in parallel with two token readers as shown for terminal 12N in FIG. 1. The operation then proceeds to step 140 to algorithmically combine the intermediate values generated in the two tokens in a manner to generate the desired private key for encryption, which key is then stored in the processor 16 during step 142.

Further, during step 144, the processor 16 makes a determination as to whether a secret device code or codes is also required to generate the private key from the value read during step 125. Such secret device code may be utilized to assure that operations involving the private key or other secure token codes only occurs at a secure location and on a secure processor or other device. If device code is utilized in generating the private key, the value stored during step 128 and read into the processor during step 135 by, for example, a token reader 22 is algorithmically combined with the processor device code in a predetermined manner during step 148 to obtain the desired private key which is then stored during step 142. If the system is operating in two token mode and device code mode, the device code may be inputted as an additional input during step 140, the algorithm in processor 16 utilizing the device code in addition to the other inputs in generating the private key. If there are "no" outputs during steps 136 and 144, then the private key stored in processor 16 during step 142 is the private key read out from the token during step 135 by, for example, a card reader 22.

As illustrated by terminal 12B, one option in practicing the teachings of this invention is to perform encryption/decryption utilizing the private key directly in the processor 40 (FIG. 2B) of a token 30. A token I/O device 24 (FIG. 1) is required for performing this function, which device reads data from processor 16 which is to be either encrypted or decrypted in processor 40 through device 44 (FIG. 2B) and reads data from the token through a device 44 back into the processor 16 after it has been encrypted, decrypted or otherwise processed utilizing the private key in processor 40. Thus, referring again to FIG. 6, during step 150, a determination is made as to whether encryption/decryption or other processing is to be performed in the token. If such processing is to be performed, data is read into the token and into the processor 40 for encryption, decryption or other processing during step 152 and the required processing is performed in processor 40 utilizing the private key stored during step 128 (step 154). Once processing of data has been completed during step 154, the processed data is read from the token back to processor 16 during step 156. The operation then proceeds to step 158 to determine if all data to be processed has been processed or if there is more data to be processed. If there is more data to be processed, the operation returns to step 152 to read such additional data into the token and steps 152, 154, 156 and 158 are repeated for successive data segments until, during step 158, a determination is made that there is no more data to be processed. When this occurs, the operation proceeds to step 160 to terminate this processing operation. While not specifically indicated in FIG. 6, step 160 may also involve the zeroizing or other removal of the private key from the token.

A method and apparatus are thus provided which permit a private key or other secure code stored in a token to be utilized in a variety of applications and in a variety of modes, but which assure that, except when the secure token code is actually in use, there is nothing stored in the token which would be of any use to anyone other than an authorized user of the token. Significantly enhanced security for token-stored secure codes is thus provided.

While the invention has been particularly shown and described above with reference to preferred embodiments, and a number of variations have been described for various preferred embodiments, these embodiments are merely illustrative of the invention and it will be apparent to those skilled in the art that the foregoing and other changes in form and detail may be made therein by one skilled in the art without departing from the spirit and scope of the invention.

What is claimed is:

1. Apparatus for providing enhanced security for a multibit secure token code which is obtained from a token, the apparatus comprising:

means included as part of said token for storing a multibit token secret which is related to the secure token code in a predetermined way;

a character input device on said token for inputting a multicharacter secret code known to an authorized user of the token; and a processor in said token for generating the corresponding secure token code from the stored token secret and the inputted secret code and for storing the generated secure token code in the token.

2. Apparatus as claimed in claim 1 wherein said processor includes means for modifying the stored multibit token secret to a new multibit token secret which will generate the secure token code with a new secret code in the means for generating when the secure code is stored in the token and a predetermined character is received followed by the new secret code.

3. Apparatus as claimed in claim 1 including means for removing the secure token code from the token when selected conditions occur, leaving said multibit token secret with the token.

4. Apparatus as claimed in claim 3 wherein said means for removing includes timer means for removing the secure token code a selected period of time after the secure token code is obtained.

5. Apparatus as claimed in claim 3 including means for reading the secure token code from the token, and wherein said means for removing includes means for removing the secure token code when the reading of the secure token code by said means for reading is completed.

6. Apparatus as claimed in claim 3 including means for reading and using the secure token code, and wherein the means for removing includes means for removal of the secure token code when use thereof is completed.

7. Apparatus for providing enhanced security for a multibit secure token code which is obtained from a token, the apparatus comprising:

means included as part of said token for storing a predetermined multibit token secret which is related to the secure token code in a predetermined way;

means for inputting a multicharacter secret code known to an authorized user of the token; and means for generating and storing the secure token code when the predetermined multibit token secret stored with the token and the inputted secret code are received.

8. Apparatus as claimed in claim 7 including means for generating said multibit token secret, said means including means for utilizing a combining algorithm to combine said secure token code with said secret code.

9. Apparatus as claimed in claim 8 wherein said means for utilizing includes means for exclusive ORing bits of said secret code with at least selected bits of said secure token code.

10. Apparatus as claimed in claim 9 wherein said means for generating and storing the secure code includes means for exclusive ORing bits of said secret code with bits of the multibit token secret corresponding to said at least selected bits.

11. Apparatus as claimed in claim 8 wherein said token includes means for inputting a selected plurality of characters, wherein said token initially has stored therein said secure token code, and wherein the means for utilizing a combining algorithm includes processor means within said token and responsive to a predetermined input from said means for inputting followed by the inputting of said secret code for modifying the secure token code with the secret code to obtain the multibit token secret.

12. Apparatus as claimed in claim 11 wherein said processor means modifies the stored multibit token secret with the secret code to obtain the secure token code when said secret code is subsequently inputted.

13. Apparatus as claimed in claim 12 wherein said processor means modifies the secure token code with a new secret code to obtain a new multibit token secret when the token contains the secure token code and a predetermined input is received followed by the new secret code, the processor being responsive to subsequent inputting of the new secret code for generating the secure token code.

14. Apparatus as claimed in claim 12 including means for removing the secure token code from the token when selected conditions occur, leaving said multibit token secret with the token.

15. Apparatus as claimed in claim 14 wherein said means for removing includes timer means for removing the secure token code a selected period of time after the secure token code is generated.

16. Apparatus as claimed in claim 14 including means for reading the secure token code from the token, and wherein said means for removing includes means for removing the secure token code after reading of the secure token code by said means for reading is complete.

17. Apparatus as claimed in claim 12 wherein said secure token code is an encryption key for an encryption system;

including input/output means for data to be applied to the token for encryption or decryption; and wherein said processor means includes means for utilizing said encryption key to operate on inputted data to perform encryption/decryption thereon.

18. Apparatus as claimed in claim 8 wherein said means for generating the multibit token secret includes a terminal having a processor, a character input device for said processor and a token reader/writer, the processor receiving the secure token code from reading of the token by the token reader/writer, receiving the secret code inputted at the input device by the authorized user, utilizing a combining algorithm to combine the secure token code and the secret code to produce the multibit token secret, and outputting the multibit token secret to the reader/writer to be written in the token.

19. Apparatus as claimed in claim 8 wherein said means for generating the multibit token secret includes a processor having a token reader/writer, said processor generating the multibit token secret in accordance with a predetermined combining algorithm from the secure token code and the secret code for the authorized user and outputting the generated multibit token secret to the token reader/writer, the token reader/write writing and storing the generated multibit token secret in the token.

20. Apparatus as claimed in claim 7 wherein said means for generating and storing the secure token code includes a processor, a token reader and a character input device, the token reader reading the multibit token secret from the token and providing read multibit token to the processor, the input device receiving the secret code from the authorized user and providing it to the processor and the processor utilizing the received multibit token secret and secret code to generate and store the secure token code.

21. Apparatus as claimed in claim 20 wherein said means for generating and storing the secure code includes means for utilizing a combining algorithm to combine bits of said secret code with bits of the multibit token secret corresponding to said at least selected bits.

22. Apparatus as claimed in claim 21 wherein said means for generating and storing the secure code includes means for exclusive ORing bits of said secret code with bits of the multibit token secret corresponding to said at least selected bits.

23. Apparatus as claimed in claim 7 wherein said means for generating and storing the secure token code includes a processor, and at least one token reader, and wherein said processor generates and stores the secure token code in response to the receipt of multibit token secrets from at least two tokens, said token secrets being received through said at least one token reader.

24. Apparatus as claimed in claim 23 wherein there is a single token reader, multibit token secrets from said token being received serially at said processor.

25. Apparatus as claimed in claim 23 wherein there is a token reader for each token utilized to generate the secure token code, multibit token secrets from the tokens being received in parallel at said processor.

26. Apparatus as claimed in claim 23 including an input device for inputting a corresponding secret code for each token.

27. Apparatus as claimed in claim 26 wherein said input device is part of each token, each token also including a processor, the code read by the token reader into the processor being an intermediate code generated in the token processor from the multibit token secret stored therein and the corresponding secret code.

28. Apparatus as claimed in claim 7 wherein said means for generating and storing the secure token code includes a processor having a multibit device code stored therein, said processor having means for utilizing a combining algorithm to combine the multibit token secret, the corresponding secret code and the device code to generate the secure token code.

29. Apparatus as claimed in claim 28 wherein the processor includes a token reader and an input device, the token reader reading the multibit token secret from the token and providing the read multibit token secret to the processor, the input device receiving the secret code from the authorized user and providing the received secret code to the processor.

30. Apparatus as claimed in claim 29 wherein said means for utilizing a combining algorithm includes means for exclusive Oring bits of said secret code with selected bits of said multibit sequence, said selected bits being determined by the device code.

31. Apparatus as claimed in claim 7 wherein the secure token code is the private key in a public/private key encryption system.

32. Apparatus as claimed in claim 7 wherein the secure token code is an encryption/decryption key.

33. Apparatus for providing enhanced security for a multibit secure token code which is obtained from a machine readable token, the apparatus comprising:

means included as part of said token for storing a multibit token secret which is related to the secure token code in a predetermined way; and a terminal having a processor, a character input device for said processor and a token reader, an authorized user utilizing said input device to input a multicharacter secret code known to such user into the processor, said token reader reading the stored multibit token secret from a token applied thereto, and said processor utilizing a combining algorithm to combine the secret code and multibit sequence applied thereto to obtain a corresponding secure token code.

34. A token having a memory element for storing a selected multibit sequence which is used under selected conditions to generate a desired multibit secure token code unique to a token user, which token is formed by the process of:

initially storing said multibit secure token code;

inputting a secret code known to the token user;

utilizing a combining algorithm to combine the secure token code and the secret code to generate the a multibit token secret, the multibit token secret when algorithmically combined with the secret code producing the secure token code; and storing the multibit token secret as the selected multibit sequence in the token memory element.

35. A method for storing in a token memory element a selected multibit token secret which is mused under selected conditions to generate a desired multibit secure token code unique to the token user, the method comprising the steps of:

initially storing said multibit secure token code;

inputting a secret code known to the token user;

utilizing a combining algorithm to combine the secure token code and the secret code to generate the multibit token secret, the multibit token secret when algorithmically combined with the secret code producing the secure token code; and storing the multibit sequence in the token memory element.

36. Apparatus for storing in a token memory element a selected multibit token secret which is used under selected conditions to generate a desired multibit secure token code unique to a token user, the apparatus comprising:

means for storing said multibit secure token code;

means for inputting a secret code known to the token user;

means for utilizing a combining algorithm to combine the secure token code and the secret code to generate the multibit token secret, the multibit token secret when algorithmically combined with the secret code producing the secure token code; and means for storing the multibit token secret in the token memory element.

37. A method for utilizing a token storing a selected multibit token secret to generate a desired multibit secure token code unique to a token user, the method comprising the steps of:

reading out the multibit token secret;

inputting a secret code known to the token user, and utilizing a combining algorithm to combine the read-out multibit token secret and the inputted secret code to generate the multibit secure token code.

38. Apparatus for utilizing a token storing a selected multibit token secret to generate a desired multibit secure token code unique to a token user, the apparatus comprising:

means for reading out the multibit token secret;

means for inputting a secret code known to the token user; and means for utilizing a combining algorithm to combine the read-out multibit token secret and the inputted secret code to generate the multibit secure token code.

* * * * *